(12) United States Patent
Goelling

(10) Patent No.: US 9,017,797 B2
(45) Date of Patent: Apr. 28, 2015

(54) METAL COATING

(75) Inventor: Burkhard Goelling, Stuhr (DE)

(73) Assignee: Airbus Operations GmbH, Hamburg (DE)

( * ) Notice: Subject to any disclaimer, the term of this patent is extended or adjusted under 35 U.S.C. 154(b) by 697 days.

(21) Appl. No.: 12/562,846

(22) Filed: Sep. 18, 2009

(65) Prior Publication Data
US 2010/0080958 A1 Apr. 1, 2010

Related U.S. Application Data

(60) Provisional application No. 61/192,662, filed on Sep. 19, 2008.

(30) Foreign Application Priority Data

Sep. 19, 2008 (DE) .......................... 10 2008 042 237

(51) Int. Cl.
| | | |
|---|---|---|
| B32B 3/00 | (2006.01) | |
| B32B 15/04 | (2006.01) | |
| C23C 16/513 | (2006.01) | |
| B32B 33/00 | (2006.01) | |
| B32B 15/08 | (2006.01) | |
| B32B 38/00 | (2006.01) | |
| B05D 7/00 | (2006.01) | |
| B29C 59/04 | (2006.01) | |

(52) U.S. Cl.
CPC ......... *B32B 33/00* (2013.01); *Y10T 428/24612* (2015.01); *Y10T 428/269* (2015.01); *B32B 15/08* (2013.01); *B32B 38/0008* (2013.01); *B32B 2038/0092* (2013.01); *B32B 2307/754* (2013.01); *B32B 2310/14* (2013.01); *B32B 2311/00* (2013.01); *B05D 7/50* (2013.01); *B29C 59/046* (2013.01); *B05D 2202/00* (2013.01)

(58) Field of Classification Search
CPC .... B32B 15/08; B32B 2307/754; B64C 21/00
USPC .......................... 428/172, 339; 244/130, 200
See application file for complete search history.

(56) References Cited

U.S. PATENT DOCUMENTS

| | | | |
|---|---|---|---|
| 5,200,253 A | | 4/1993 | Yamaguchi et al. |
| 6,800,354 B2 * | | 10/2004 | Baumann et al. ............. 428/141 |
| 2003/0116281 A1 * | | 6/2003 | Herbert et al. ............. 156/379.6 |
| 2005/0185518 A1 | | 8/2005 | Kawakami et al. |

(Continued)

FOREIGN PATENT DOCUMENTS

| | | |
|---|---|---|
| DE | 40 25 296 A1 | 2/1991 |
| DE | 103 37 456 A1 | 6/2004 |

(Continued)

*Primary Examiner* — Maria Veronica Ewald
*Assistant Examiner* — Laura Auer
(74) *Attorney, Agent, or Firm* — Jenkins, Wilson, Taylor & Hunt, P.A.

(57) ABSTRACT

The present invention relates to a coated object comprising at least
(a) a metal layer,
(b) a coupling layer,
(c) an inner polymer layer, and
(d) a substrate surface,
wherein the coupling layer (b) is arranged between layers (a) and (c) and connects said layers, the polymer layer (c) being arranged on the substrate surface (d) and the sum of the diameters of layers (a) and (b) being between 5 nm and 500 nm. The invention also relates to methods and devices for producing the object.

17 Claims, 3 Drawing Sheets

Two dimensional cross-section of the layer assembly (schematic view)
variant A with an optional final cover layer
(layer thicknesses not to scale.)
(example of a trapezoidal micro-groove structure)

(56) References Cited

U.S. PATENT DOCUMENTS

2005/0254114 A1* 11/2005 Shinohara et al. ............ 359/265
2007/0002421 A1* 1/2007 Rukavina et al. ............ 359/265
2007/0257400 A1   11/2007 Stenzel et al.
2010/0028684 A1*  2/2010 Mariscal et al. ............. 428/413

FOREIGN PATENT DOCUMENTS

| DE | 103 46 124 A1 | 5/2005 |
| DE | 10 2005 004 437 A1 | 9/2005 |
| EP | 1 454 999 | 9/2004 |

* cited by examiner

METAL COATING

RELATED APPLICATIONS

This application claims the benefit of U.S. Provisional Application No. 61/192,662, filed Sep. 19, 2008 and German Patent Application No. DE 10 2008 042 237.1, filed Sep. 19, 2008, the entire disclosures of which are herein incorporated by reference.

The present invention relates to coated objects as well as methods and devices for their production.

There is a general need to protect surfaces from wear and damage. The wear and damage of surfaces is particularly problematic if the surfaces have a function to fulfil. Surfaces of functional materials often consist of coatings which, by nature, are not very hard or hard-wearing. This is the case, for example, with microstructured surfaces which are used, inter alia, within the technical field of self-cleaning surfaces and to reduce frictional drag.

Microstructured surfaces are used, for example, to reduce the air drag of vehicles and aircraft. In the case of what is known as a riblet structure, a surface is provided with small microscopic ribs. Surfaces made of metal, such as aluminium alloys or carbon fibre, are thus provided with a polymer lacquer consisting of polyurethane for example. Once the polymer has been applied to the surface, the microstructure is imprinted in the surface and the lacquer is subsequently cured. A method of this type is disclosed in DE 103 46 124 A1. By using coatings of this type it is possible to reduce air drag by approximately 8 to 10%.

The known organic polymer-based microstructured surfaces pose the drawback that they are not at all hard-wearing, or are only slightly hard-wearing when loaded. Mechanical loads are exerted, for example during normal use, such as in the presence of dirt and other particles, rain, hailstones, ice crystals, when there is contact with other objects or liquids, or when there is contact with water or liquid and solid cleaning agents during cleaning processes. Tests have shown that under normal mechanical loading of a polymer-based riblet structure, the reduction in drag decreases from 8 to 10% to approximately 4%. It can be shown microscopically that the decrease in the original drag reduction is accompanied by damage, deformation and the separation of parts from the grooves in the riblet structure. Damage may also occur during thermal and chemical loading. In the case of continuous mechanical loading, the positive effect of the drag reduction may even be reversed and may lead to an increase in frictional drag, in particular in comparison with a smooth, unstructured surface.

A particularly significant reduction in frictional drag is achieved using riblet structures which have very thin, "pointed" projections on the surface. However, even structures of this type are easily damaged, in particular mechanically, so practical use is often impossible or inefficient. In accordance with the prior art the desired reduction in drag is thus achieved owing to reasons of stability.

An object of the present invention is to provide coated objects and a method for their production, which overcome the aforementioned drawbacks. In accordance with the invention, coatings are provided which have a high level of stability under mechanical load.

The coatings shall also be applied uniformly in a simple manner. The method may optionally also be implemented together with previous methods for providing a lacquer coating. The method shall also make it possible to coat large components, such as aircraft or vehicle surface parts. The coated objects shall have high levels of surface hardness, abrasion resistance and scratch resistance. The surfaces shall be as crack-free as possible and there shall be are no ridges on the points of the microstructure. Impact strength under the mechanical influence of particles measuring from a few micrometres to a few millimetres in size, such as grains of sand, shall be ensured.

The coating shall adhere rigidly and securely to the object. In accordance with the invention, it shall also be possible to produce coated objects having a specific surface topology, such as end flanks and tips. In particular, the objects according to the invention shall comprise a large amount of stable and efficient functional microstructures.

In addition, the coating shall have a high level of chemical resistance, in particular corrosion resistance, and shall be resistant to acids and bases.

The method according to the invention shall also be environmentally friendly and economically viable.

According to the invention, this objective is achieved by objects having the features of claim 1.

The subject-matter of the invention is a coated object, comprising at least
  (a) a metal layer,
  (b) a coupling layer,
  (c) an inner polymer layer, and
  (d) a substrate surface,
wherein the coupling layer (b) is arranged between layers (a) and (c) and connects said layers, the polymer layer (c) being arranged on the substrate surface (d) and the sum of the diameters of layers (a) and (b) being between 10 nm and 500 nm.

Advantageous embodiments and improvements of the invention can be found in the sub-claims.

According to a preferred development the metal layer (a) comprises cobalt, copper, tungsten, molybdenum and/or chromium. In one embodiment of the invention the metal layer forms the outer layer of the coated object. It thus offers protection against mechanical influences. The metal layer may also consist of a metal alloy. In a further embodiment the layer is mixed or doped with additives so as to improve the properties. The metal layer preferably contains more than 80%, 95%, 98% or 99% metals. In a preferred embodiment it is made completely of metal. In a preferred embodiment the metal layer (a) is applied in a plasma treatment. The thickness of the metal layer is preferably between 2 nm and 400 nm, in particular between 5 nm and 200 nm or between 10 nm and 100 nm. Provided the object comprises a microstructured surface, the thickness of the metal layer is selected in such a way that the surface structure is changed as little as possible.

In one embodiment of the invention an additional cover layer (a0) is provided on the metal layer (a). The cover layer may afford the metal layer (a) corrosion resistance or lasting chemical resistance. The cover layer consists of $SiO_2$ for example. The layer thickness may be between 10 nm and 200 nm. Similarly to the metal layer (a), the cover layer (a0) is preferably applied in a plasma process. The metal layer is either previously or simultaneously activated in order to achieve an efficient bond between the metal layer and the $SiO_2$ as the cover layer.

According to a preferred embodiment, the coupling layer (b) comprises a metal oxide. The coupling layer connects the polymer layer (c) to the metal layer (a). Titanium oxides, such as $TiO$, $TiO_2$, $Ti_2O_3$ or silicon oxide ($SiO_2$) or a combination of titanium oxide and silicon oxide are preferably used as metal oxides. The material is selected in such a way that a stable bond to both the polymer layer and the metal layer is achieved. The coupling layer (b) is thus preferably applied in a plasma process in which the underlying polymer layer (c) is activated either previously or simultaneously. The layer thickness is preferably between 2 nm and 400 nm, in particular between 5 nm and 200 nm or between 10 nm and 100 nm.

In a preferred embodiment, the polymer layer comprises a polyurethane and the coupling layer comprises a titanium oxide. The titanium oxide is covalently bonded to the polyurethane via Ti—O—C or direct Ti—C bonds.

The coupling layer (b) may contain additives which improve adhesion. For example, a metal oxide may be mixed with a specific amount of metals. In preferred embodiments the coupling layer (b) consists of at least 50, 80, 90 or 95% metal oxides.

The polymer layer preferably consists of an organic polymer. According to a preferred embodiment the inner polymer layer (c) comprises a polyurethane, polyacrylate, polymethacrylate, polyepoxide, polysilicone or a copolymer thereof. The bond to the adjacent coupling layer (b) is preferably achieved by covalent chemical bonds. The polymer layer is preferably cross-linked once applied, for example by (UV) radiation. It is preferable for the polymer layer (c) to be activated before the coupling layer (b) is applied. In a preferred embodiment, the polymer layer thus comprises reactive groups at the polymer backbone, which groups can be activated using conventional methods, for example during plasma treatment. Halogen substituents, such as fluorine or chlorine, hydroxyl, acid, ester, nitrile, amine, sulphide, sulphone or carbonyl groups, are suitable for example.

According to a preferred development the inner polymer layer (c) comprises a microstructure. The microstructure is, for example, a riblet structure or a self-cleaning structure. Microstructures of this type may be produced in accordance with known methods. A method for producing microstructured surfaces is disclosed, for example in DE 103 46 124 A1, to which reference is expressly made in this description. The riblet surfaces disclosed in said document have a low level of flow drag and thus improve the speed and energy consumption of mobile objects. Known riblet structures comprise, for example, triangular, trapezoidal or U-shaped structures. The height of the grooves/projections and distance therebetween may be between 5 and 500 µm for example.

Microstructured surfaces with self-cleaning properties have a lotus leaf structure or are based on this. They are resistant to, or unaffected by dirt and fouling. According to DE 103 46 124 A1, a microstructured surface is generated using a tool which comprises a matrix which is a negative of the microstructure to be generated. The microstructure is pressed into a surface using a driveable pressure roller. A polymer film is preferably used which is cured, after the microstructure has been imprinted.

The thickness of the polymer layer is preferably between 1 µm and 100 µm, in particular between 2 µm and 500 µm. If microstructures are provided, the layer thickness denotes the thickness at the maximum recesses in the structure. The maximum projections of the structures may be, for example, 10 µm to 1,000 µm, in particular 20 µm to 400 µm.

In accordance with known methods, the inner polymer layer (c) is applied onto a substrate surface (d). According to the invention, the term "substrate surface" generally denotes the surface of an object which is provided with layers (a) to (c) or (a0) to (c). The substrate surface (d) may consist of metals for example, such as aluminium alloys, glass-reinforced aluminium (GLARE), steel or carbon fibre. In methods of this type the substrate is often first cleaned and provided with at least one primer layer. For specific applications, for example within the field of aircraft construction, intermediate layers may also be contained between the polymer layer and the substrate, which intermediate layers ensure the improved and long-lasting stable bond. In this case, the intermediate layers are polymer layers, of which the properties for binding to connecting layers are improved by nanoparticles, such as TiO and $SiO_2$, and which are produced by in-situ methods.

The invention also relates to a method for producing a coated object according to the invention, in which the cover layer (a0), the metal layer (a) and the coupling layer (b) are applied by way of a plasma treatment. During the course of a plasma treatment of this type, a coating is produced by depositing an evaporated material on a surface. During plasma treatment, the surface which is coated may also be activated. A reactive surface is thus generated which forms a chemical bond with the coating material. It is preferred, in accordance with the invention, to activate the inner polymer layer (c) in a plasma treatment. It is thus advantageous for the polymer layer to comprise activatable groups, such as hydroxyl groups or halogen substituents. In a further embodiment the polymer layer is also doped with nanoparticles of the aforementioned type.

The plasma treatment may be carried out in a conventional plasma process using a plasma generator. A low-pressure plasma, a high-pressure plasma or an atmospheric-pressure plasma may be used. According to the invention it is preferred to use an atmospheric-pressure plasma. The use of an atmospheric-pressure plasma is considerably easier, in particular in the case of large components and industrial manufacturing. Conventional gases, such as argon, nitrogen, hydrogen, carbon dioxide, hydrocarbons or mixtures of these gases may be used as a working gas. The workpiece is preferably subjected to a plasma jet.

According to a preferred development the method according to the invention comprises the following steps:
(A) providing an object having at least an outer polymer layer (c),
(B) activating the polymer layer (c),
(C) applying the coupling layer (b) to the polymer layer (c) and
(D) applying the metal layer (a) to the coupling layer (b), and optionally
(E) applying a final, outer cover layer (a0) to the metal layer (a),
steps (B) to (E) being carried out by way of a plasma treatment. Steps (C), (D) and (E) are thus plasma coating methods.
Step (B), in which the polymer layer (C) is activated by a plasma treatment, also simultaneously cleans the surface. Argon, optionally added to $CO_x$ gas, is a suitable working gas for example. The coupling layer is coated in step (C) at an increased temperature of, for example, 2,000 to 3,500 Kelvin, in particular 2,500 to 3,300 Kelvin depending on the material used. The coupling material is deposited on the polymer layer (c) and preferably forms a chemical bond therewith. When applying the metal layer in step (D), the required temperature is set depending on the metal used. Temperatures of between 2,500 and 3,800 Kelvin for example, in particular between 2,800 and 3,600 Kelvin are normal.

The thickness of the layers can be adjusted by calibrating the intensity, time and angular projection of the plasma jet. The contact temperature on the surface of the polymer (c) is set in such a way that any physical change to the polymer surface which exceeds activation is avoided. In particular, any microstructures which may be present should not be damaged. The contact temperature on the polymer surface is set so as to be lower than 390 Kelvin for example.

In a preferred embodiment before step (A) a substrate surface (d) of the object is provided with the polymer layer (c)

in a step (A0). The polymer is thus applied from a discharge device onto the substrate surface and is distributed uniformly.

In a further preferred embodiment after step (A0) and before step (A) the polymer layer is provided with a microstructure in a step (A1). This may be achieved, for example, using an imprinting device. The polymer layer is subsequently cured, for example by way of UV radiation or a thermal treatment. The imprinting device is, for example, a roller. Devices of this type are disclosed in DE 103 46 124 A1 for example.

In a preferred embodiment of the invention the method according to the invention comprising steps (A) to (D) and (E) as well as the production of the polymer layer and optionally the generation of a microstructure in steps (A0) and (A1) is carried out in a single, continuous process. This has the advantage that no production steps involving transportation are required.

The invention also relates to a device for producing an object in accordance with at least one of the preceding claims, comprising (i) a discharge device for producing the polymer layer (c),
(ii) an imprinting device for producing a microstructure in the polymer layer (c),
(iii) means for curing the polymer layer (c),
(iv) a plasma jet generator and
(v) a feed device.

The feed device (v) ensures, for example, that the device according to the invention is moved relative to a fixed surface to be coated. Alternatively, another embodiment is possible in which the surface to be coated passes through a fixed device. The means for curing is, for example, a UV radiator or a temporary heating means.

The plasma generator comprises means for preparing the material for radiation by the plasma. In a preferred embodiment of the invention the plasma jet generator (v) is set in such a way that it activates the polymer surface (c), subsequently applies a coating of the coupling layer (b), subsequently applies a coating of the metal layer (a) and optionally subsequently applies the final coating of the cover layer (a0).

In preferred embodiments of the invention, the object is an aircraft, motor vehicle, train, ship, wind turbine, pipe portion, or a component thereof. The coating is particularly suitable for surfaces which are subjected to turbulent air flow. These may be, for example, the wings, fuselage, nacelle and tail unit of aircraft and the bodies of motor vehicles. The object has a substrate surface (d) before it is coated with layers (a0), (a), (b), and (c).

In a particular embodiment of the invention, the substrate surface (d) is a covering film. The object according to the invention can then be applied to an object to be coated once the covering film has been separated.

The described assembly of a coated object consisting of a substrate surface, an inner polymer layer, a coupling layer and a metal layer corresponds to the simplest assembly of a coating according to the invention. However, in accordance with the invention further measures may also be taken in order, for example, to improve the adhesion or properties of the laminate according to the invention. Before applying a coating for example, primer layers may be used which strengthen the adhesion. In particular, primer layers are preferred in order to bond the substrate surface (d) to the inner polymer layer (c). This is of particular importance when different types of materials having various levels of reactivity are bonded, for example a substrate surface made of aluminium to a polymer layer made of acrylate or polyurethane.

According to the invention, it is also possible to apply a layer in two or more steps. The invention thus includes embodiments, in which the metal layer (a) is composed of a lower layer (a1) made of a first metal and an outer layer (a2) made of another metal. This may be expedient, for example if a metal layer is deposited locally so as to produce conductive structures or signatures. In a further embodiment the coupling layer may be formed of at least two coupling layers (b1) and (b2), for example if stability is to be improved by selecting different coupling materials.

In a preferred embodiment of the method according to the invention, an object with a microstructured polyurethane-based lacquer layer is used. The workpiece is cleaned with ionised argon with the addition of hydrocarbons, the surface lacquer system simultaneously being activated. In a subsequent step, the coupling layer is applied to the polyurethane lacquer. Titanium dioxide is evaporated at approximately 3,000 Kelvin and is deposited on the surface in a plasma jet. In a subsequent method step the outer metal layer is applied. Cobalt is evaporated at 3,200 Kelvin in plasma and deposited on the titanium dioxide layer. The microstructured substrate exhibits an improved surface topology. In addition, improved behaviour with regard to resistance against mechanical influences is obtained. This can be observed using a scanning electron microscope in a sandblasting test with particle sizes within the microstructuring range.

The method and device according to the invention are also suitable for coating curved components and surfaces, such as fuselage cells of an airliner. The microstructure is thus produced in an imprinting device by rotation, for example on a roller. The negative form is arranged on a flexible surface, for example a polyamide film, and follows the corresponding curve of the object. The form of the microstructure is thus imprinted in the previously applied lacquer layer. The polymer layer is then cured, for example by way of pre-irradiation, and the further coating is cured in a plasma process. The method for imprinting and coating curved surfaces is shown schematically in FIG. 3.

On the whole, the subject of the invention solves the problem underlying the invention. Coatings are obtained which afford the surface a high level of abrasion resistance and scratch resistance. The surface is also resistant to cracks and mechanical loading, for example impact blows or grains of sand. The stabilisation of the surface makes it possible to use microstructures having "pointed" structures, optionally within the nanometre range, which would be too unstable against mechanical loading without the coating.

The method according to the invention can also be carried out easily as an integrated method. A workpiece may be provided with a microstructure and a protective coating in a single method which is only carried out once. The method is economically viable and environmentally friendly since all the steps are carried out within the same method environment and no intermediate products need to be transported.

As mentioned above, the method according to the invention is suitable, in particular, for uniformly coating microstructures with protective layers within the nanometre range. However, in accordance with the invention it is also possible to coat smooth surfaces or surfaces having macrostructures. Within the field of aviation therefore, the surfaces of trailing edge flaps for example can be coated in accordance with the invention, which flaps contact the lower rear region of the wing case during retraction following take-off or landing and are thus mechanically loaded. The surface coating according to the invention makes it possible to sustainably improve the service life of components and functional surfaces of this type. Maintenance costs can be reduced and the service life of the components extended.

The coating according to the invention is also suitable for producing electronic units, such as sensors, actuators, antennae or other electronically operated units and/or systems. In particular, in the case of objects of this type it is advantageous in accordance with the invention to structure the metal layer or a portion thereof and to thus produce electrical conductive tracks.

In a further embodiment of the invention, the metal layer may also be applied in such a way that the final object, for example an aircraft or a motor vehicle, is protected against lightning as a Faraday shield, i.e. the lightning cannot be conducted at the surface of the aircraft for example. In accordance with the prior art, in the case of aircraft it is necessary to protect exterior components made of carbon fibres against lightning strikes with copper wires. The metal coating according to the invention thus simultaneously offers mechanical protection as well as protection against lightning strikes by forming a Faraday shield.

In a further embodiment of the invention, the metal layer (a), optionally in combination with the final cover layer (a0), is applied in such a way that a radio signature is produced. When using the coatings according to the invention within the field of aviation, it is thus possible to adjust, amend or manipulate in a targeted manner the radio signature of a flying object, such as a manned or unmanned aircraft, by using suitable metal materials. Other signatures may thus be copied, modelled or amended from the original radio signature in such a way that the specific signature is rendered unrecognisable.

The metal surface coating according to the invention is also suitable as a protective layer, for example offering protection against acids or bases. It may therefore be used specifically in instances where electronic systems must be protected against the effect of liquids, for example hydraulic fluid or battery fluid.

The invention will be described in more detail below with the aid of embodiments with reference to the accompanying figures, in which:

FIG. 1 is a cross-section of a coated object of the invention comprising a substrate surface (1), a polymer layer (2) with microstructures (5), a coupling layer (3) and a metal layer (4). The layer thicknesses are shown purely schematically and do not correspond with the actual proportions. In accordance with the invention, the thickness of the coupling layer (4) and metal layer (5) are preferably within the nano range, whilst the thickness of the polymer layer (2) is preferably within the micro range.

In the figures, like or functionally similar components are denoted with like reference numerals, unless otherwise indicated.

Figure 1:
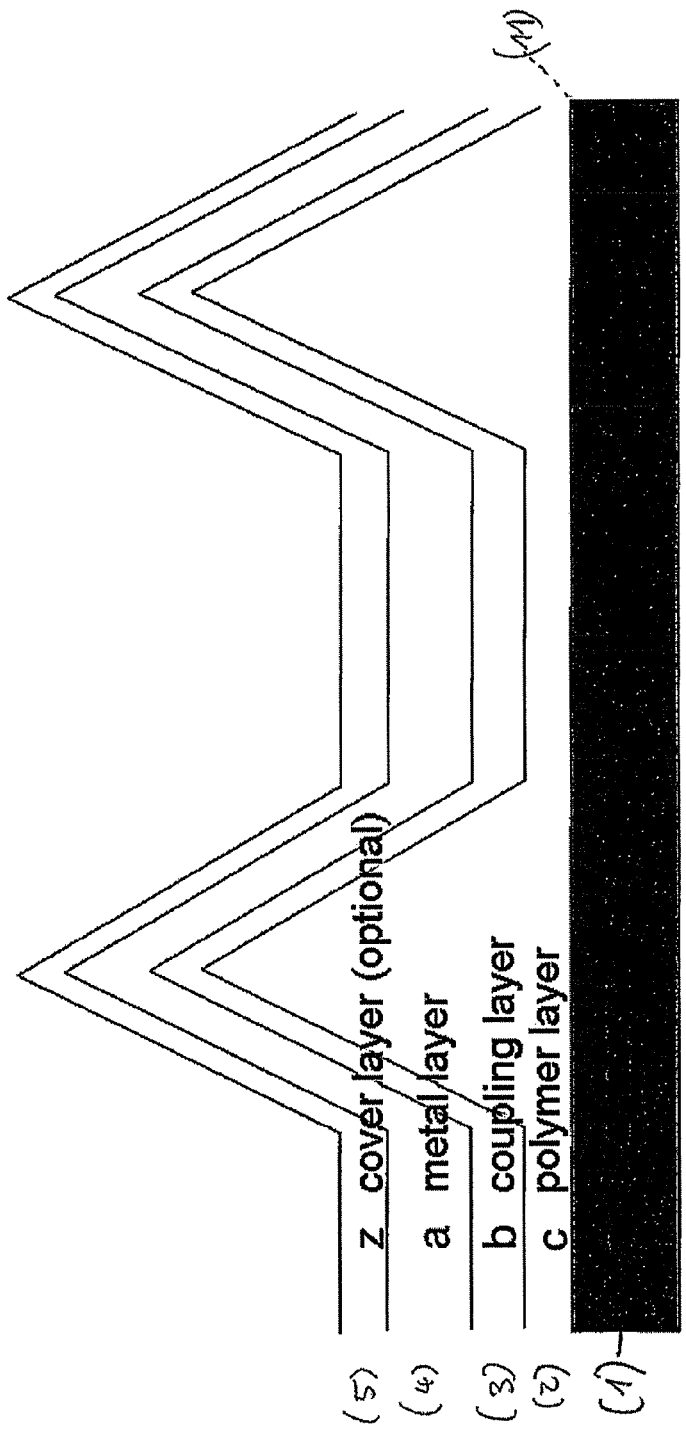
Figure 2:
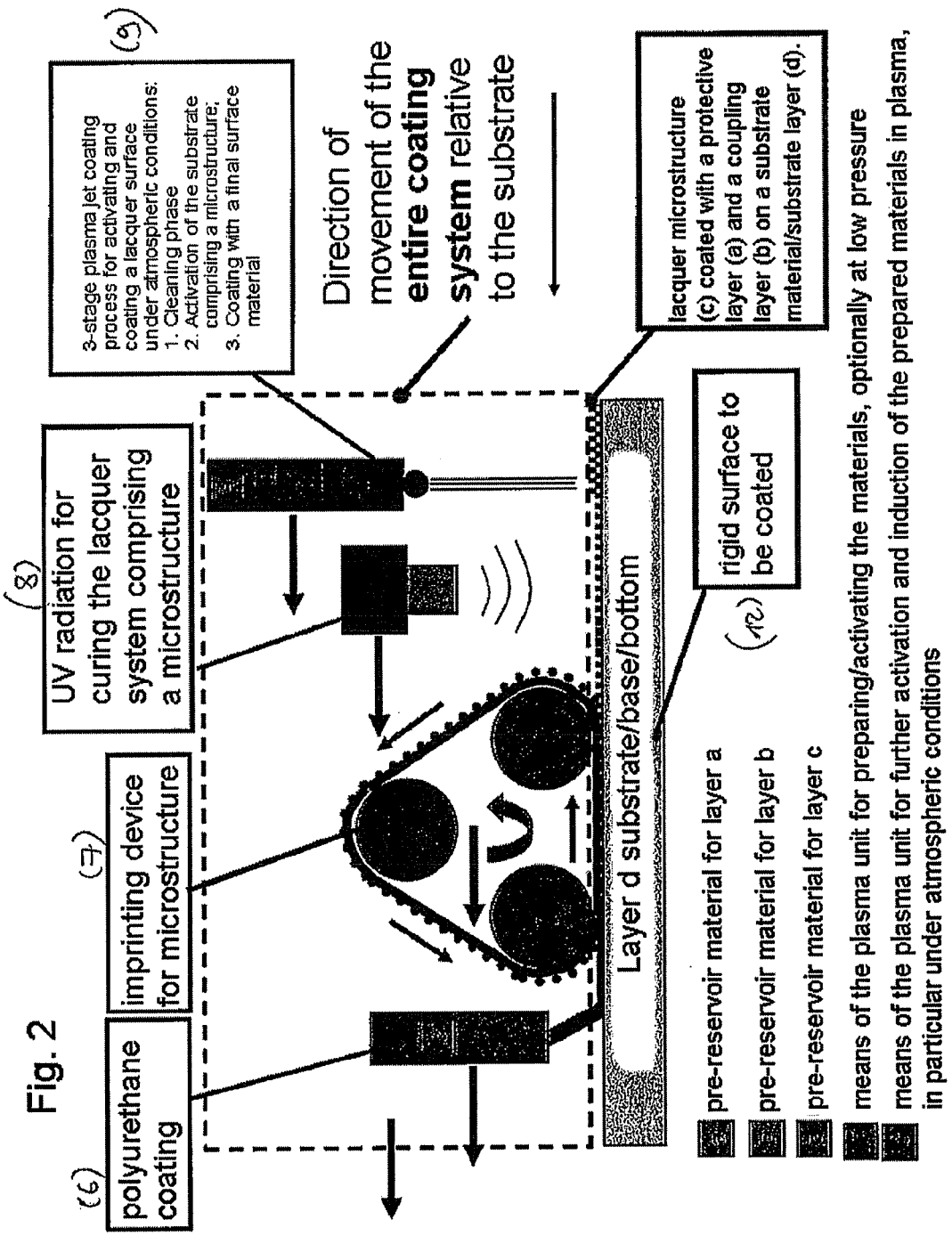
FIG. 2 is a schematic view of a device for an integrated plasma jet process according to the invention comprising a discharge device (6), an imprinting device (7), means for curing the polymer layer (8), and a plasma jet generator (9) for coating a surface (12).
Figure 3:
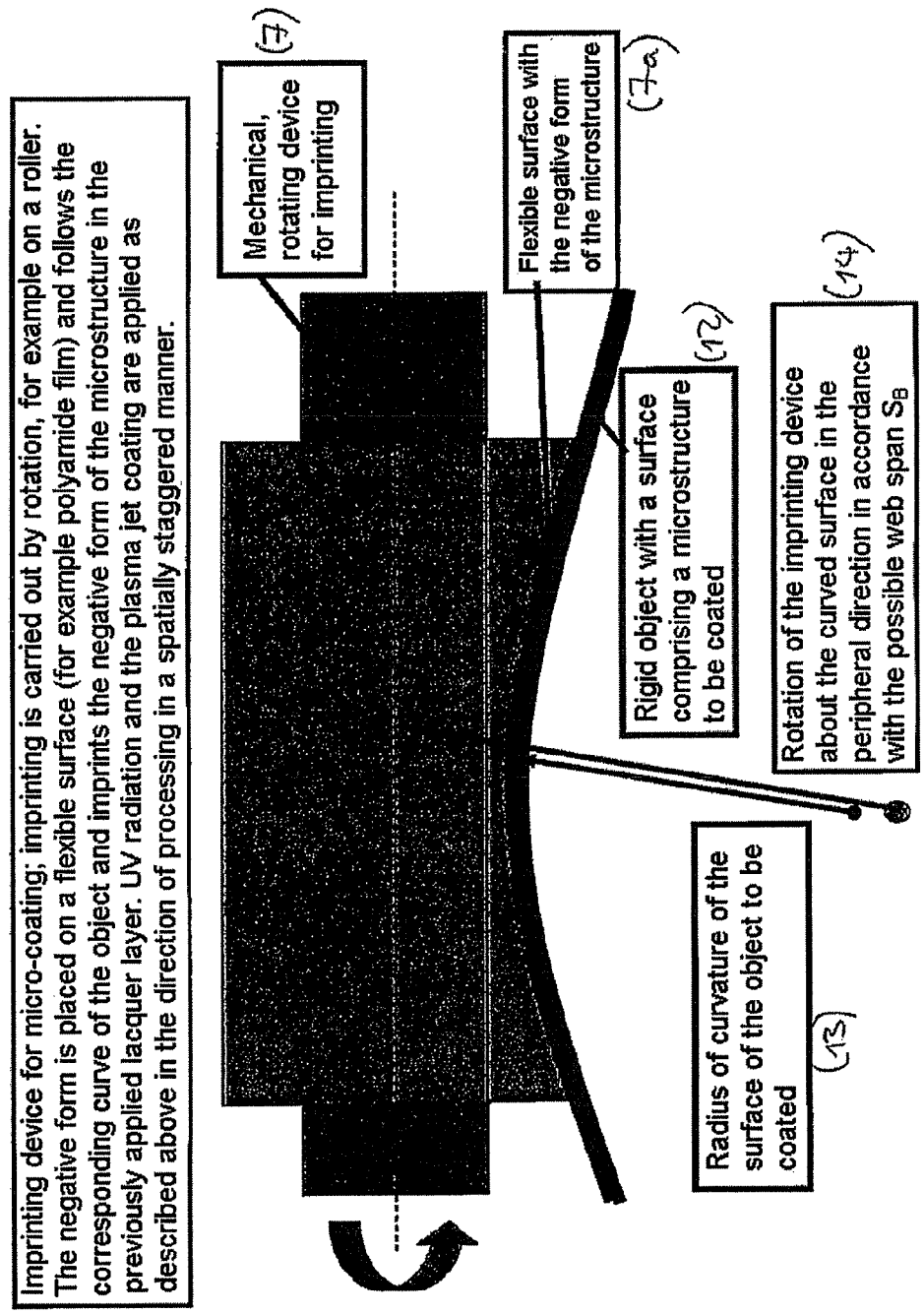
FIG. 3 is a schematic view of the process according to the invention when coating curved surfaces using an imprinting device (7), and a surface (12) to be coated. The radius of curvature (13) and the rotation of the imprinting device (14) are shown schematically in the figure.

LIST OF REFERENCE NUMERALS 1 substrate surface
2 inner polymer layer
3 coupling layer
4 metal layer
5 microstructure
6 discharge device
7 imprinting device
7a flexible surface of the imprinting device with a negative form
8 means for curing the polymer layer
9 plasma jet generator
10 feed device
11 coated object
12 surface to be coated
13 radius of curvature
14 rotation of the imprinting device

What is claimed is:

1. Coated object comprising at least
   (a) a metal layer,
   (b) a coupling layer,
   (c) an inner polymer layer, and
   (d) a substrate surface
   wherein the coupling layer (b) is arranged between layers (a) and (c) and connects said layers, the polymer layer (c) comprises a microstructure and is arranged on the substrate surface (d), the coupling layer (b) and the metal layer (a) follow the microstructure of polymer layer (c), and the sum of the diameters of layers (a) and (b) is between 5 and 500 nm,
   wherein the coated object is produced by a method comprising the following steps:
   (A) providing an object with at least polymer layer (c),
   (B) activating the polymer layer (c),
   (C) applying the coupling layer (b) to the polymer layer (c), and
   (D) applying the metal layer (a) to the coupling layer (b),
   wherein steps (B) to (D) are carried out by a plasma treatment,
   wherein the thickness of the metal layer is between 2 nm and 400 nm, and
   wherein the contact temperature of the polymer surface is set so to be lower than 390 Kelvin.

2. Object according to claim 1, wherein the metal layer (a) comprises cobalt, copper, tungsten, molybdenum or chromium.

3. Object according to claim 1, wherein the coupling layer (b) comprises a metal oxide.

4. Object according to claim 1, wherein the polymer layer (c) comprises a polyurethane, polyacrylate, polymethacrylate, polyepoxide, polysilicone or a copolymer thereof.

5. Object according to claim 1, wherein the microstructure is a riblet structure or a self-cleaning microstructure.

6. Object according to claim 1, wherein the metal layer (a) comprises conductive structures.

7. Object according to claim 1, wherein a cover layer (a0) is also provided on the metal layer (a), wherein said cover layer (a0) is applied to the metal layer (a) by a plasma treatment.

8. Object according to claim 1, wherein the object is an aircraft, motor vehicle, train, ship, wind turbine, pipe portion or a component thereof.

9. Object according to claim 1, wherein the polymer layer (c) comprises an activated surface structure before the coupling layer (b) is applied.

10. Object according to claim 1, wherein the polymer layer (c) comprises reactive groups at the polymer backbone.

11. Object according to claim 3, wherein the metal oxide is selected from titanium oxides, silicon oxide or a combination of titanium oxide and silicon oxide.

12. Object according to claim 1, wherein the layer thickness of the coupling layer is between 5 nm and 200 nm.

13. Object according to claim 1, wherein layer (a) is an outer layer.

14. Object according to claim 7, wherein layer (a0) is an outer layer.

15. A method for producing an object according to claim 1, comprising the following steps:
   (A) providing an object with at least a polymer layer (c),
   (B) activating the polymer layer (c),
   (C) applying the coupling layer (b) to the polymer layer (c), and
   (D) applying the metal layer (a) to the coupling layer (b),
   wherein steps (B) to (D) are carried out by a plasma treatment, wherein before step (A) a substrate surface (d) of the object is provided with the polymer layer (c) in a step (A0) and, wherein after step (A0) and before step (A) the polymer layer is provided with a microstructure in a step (A1).

16. The method for producing an object according to claim 15, further comprising:
   (E) applying a cover layer (a0) to the metal layer (a) by a plasma treatment.

17. The method according to claim 15, wherein the object is an aircraft, motor vehicle, train, ship, wind turbine, pipe portion or a component thereof.

* * * * *